US010073742B2

(12) United States Patent
Swanson et al.

(10) Patent No.: US 10,073,742 B2
(45) Date of Patent: Sep. 11, 2018

(54) MANAGEABILITY REDUNDANCY FOR MICRO SERVER AND CLUSTERED SYSTEM-ON-A-CHIP DEPLOYMENTS

(71) Applicant: Intel Corporation, Santa Clara, CA (US)

(72) Inventors: Robert C. Swanson, Olympia, WA (US); Mariusz Oriol, Gdynia (PL); Janusz Jurski, Hillsboro, OR (US); Piotr Sawicki, Gdansk (PL); Robert W. Cone, Portland, OR (US); William J. O'Sullivan, Hillsboro, OR (US); Mariusz Stepka, Gdansk (PL); Babak Nikjou, Tempe, AZ (US); Madhusudhan Rangarajan, Round Rock, TX (US); Pawel Szymanski, Gdansk (PL); Piotr Kwidzinski, Folsom, CA (US); Robert Bahnsen, Tacoma, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/178,142

(22) Filed: Jun. 9, 2016

(65) Prior Publication Data

US 2016/0292038 A1    Oct. 6, 2016

Related U.S. Application Data

(63) Continuation of application No. 14/125,516, filed as application No. PCT/PL2013/000104 on Aug. 14, 2013, now Pat. No. 9,367,406.

(51) Int. Cl.
*G06F 11/00* (2006.01)
*G06F 11/14* (2006.01)
(Continued)

(52) U.S. Cl.
CPC .......... *G06F 11/142* (2013.01); *G06F 1/3296* (2013.01); *G06F 9/4881* (2013.01);
(Continued)

(58) Field of Classification Search
CPC .... G06F 11/142; G06F 11/14; G06F 11/2023; G06F 11/2028; G06F 11/203;
(Continued)

(56) References Cited

U.S. PATENT DOCUMENTS

| | | | | |
|---|---|---|---|---|
| 2002/0154605 A1* | 10/2002 | Preston | ................... | H04B 17/20 370/241 |
| 2011/0138395 A1* | 6/2011 | Wolfe | ..................... | G06F 1/206 718/105 |
| 2013/0198542 A1* | 8/2013 | Raghu | ..................... | G06F 1/329 713/322 |

OTHER PUBLICATIONS

First Office Action dated May 3, 2018 for Chinese Patent Application No. 201380078235.6, 6 pages.

* cited by examiner

*Primary Examiner* — Joseph D Manoskey
(74) *Attorney, Agent, or Firm* — Barnes & Thornburg LLP

(57) ABSTRACT

Technologies for providing manageability redundancy for micro server and clustered System-on-a-Chip (SoC) deployments are presented. A configurable multi-processor apparatus may include multiple integrated circuit (IC) blocks where each IC block includes a task block to perform one or more assignable task functions and a management block to perform management functions with respect to the corresponding IC block. Each task block and each management block may include one or more instruction processors and corresponding memory. Each IC block may be controllable to perform a function of one or more other IC blocks. The IC blocks may communicate with each other via a manage-
(Continued)

ment communication infrastructure that may include a communication path from each of the management blocks to each of the other management blocks. Via the management communication infrastructure, the management blocks may bridge communication paths between pairs of management blocks.

20 Claims, 10 Drawing Sheets

(51) Int. Cl.
    *G06F 11/20*     (2006.01)
    *G06F 9/50*     (2006.01)
    *G06F 1/32*     (2006.01)
    *G06F 9/48*     (2006.01)

(52) U.S. Cl.
    CPC .......... *G06F 9/5027* (2013.01); *G06F 9/5088* (2013.01); *G06F 11/14* (2013.01); *G06F 11/203* (2013.01); *G06F 11/2023* (2013.01); *G06F 11/2028* (2013.01); *G06F 11/2033* (2013.01); *G06F 11/2035* (2013.01); *G06F 11/2043* (2013.01); *G06F 2201/805* (2013.01); *G06F 2201/85* (2013.01)

(58) Field of Classification Search
    CPC ............. G06F 11/2033; G06F 11/2035; G06F 11/2043; G06F 11/0709; G06F 11/0724; G06F 1/3296; G06F 9/5027; G06F 9/4881; G06F 9/5088; G06F 2201/805; G06F 2201/85

See application file for complete search history.

US 10,073,742 B2

MANAGEABILITY REDUNDANCY FOR MICRO SERVER AND CLUSTERED SYSTEM-ON-A-CHIP DEPLOYMENTS

CROSS REFERENCE TO RELATED APPLICATIONS

This application is a continuation application of U.S. patent application Ser. No. 14/125,516, entitled "Manageability Redundancy for Micro Server and Clustered System-on-a-Chip Deployments," which was filed on Dec. 11, 2013 and which is a national stage entry under 35 USC § 371(b) of International Application No. PCT/PL2013/000104, which was filed Aug. 14, 2013.

BACKGROUND

System-on-a-Chip (SoC) systems are becoming more prevalent in the computing ecosystem. Clusters of SoC systems are being deployed in the datacenter with examples from various processor designers and manufacturers. As with all servers, including SoC micro servers, manageability is a requirement. Currently, Advanced RISC Machine (ARM) solutions and various other solutions include integrated manageability and this is adequate for currently available single node SoC deployments. As processing system manufacturers integrate many nodes on a FRU (Field Replacement Unit) board, or even implement many SoC systems within a given silicon package, current manageability capabilities may no longer be adequate. Each and every SoC has its own manageability access point (MAP) and this may cause reliability, availability, and serviceability (RAS) issues. For example, when it is determined that the MAP has required functionality to perform, a failure of the MAP can be a failure of the central processing unit (CPU) SoC socket or overall FRU board. A failure of a single MAP may lead to a failure of the entire component.

BRIEF DESCRIPTION OF THE DRAWINGS/FIGURES

Figure 1:
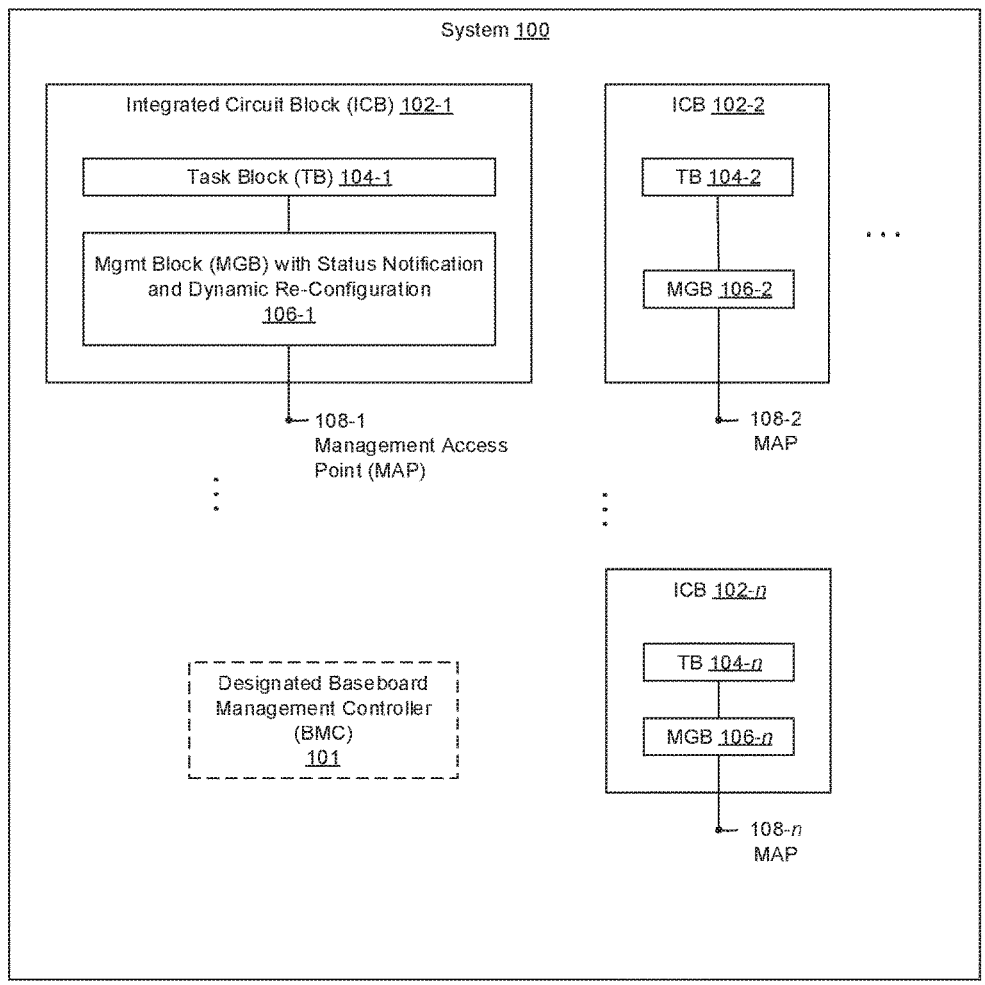
FIG. 1 is a block diagram of a system described herein, according to an embodiment.

In the drawings, the leftmost digit(s) of a reference number may identify the drawing in which the reference number first appears.

DETAILED DESCRIPTION

Technologies for providing manageability redundancy for micro server and clustered SoC deployments are disclosed herein. The discussed embodiments address various obstacles associated with these SoC-based systems, such as a reporting or functional failure of one or more IC blocks, with a solution that works across all segments yet still provides the required robust system manageability, yield recovery, and RAS.

FIG. 1 is a block diagram of a system 100 that includes multiple integrated circuit (IC) blocks 102-1 to 102-$n$ (collectively, or generally, 102), each including a task block 104-1 to 104-$n$, respectively (collectively, or generally, 104), to perform one or more functions, and a management block 106-1 to 106-$n$, respectively (collectively, or generally, 106), to perform management functions. Task blocks 104 and/or management blocks 106 may each include one or more instruction processors.

IC blocks 102, or a subset thereof, may be designed and/or manufactured to be identical to one another, and each may be configurable to perform one or more assignable functions. The assignable functions may include, but are not to be limited to, functions related to, for example, temperature control, power management, etc.

Management blocks 106, or a subset thereof, may be configured to access and/or determine status of a corresponding IC block 106, and to report the status over a communication infrastructure at a management access point (MAP) 108. Management blocks 106, or a subset thereof, may be configured to access a sensed parameter value within a corresponding IC block, and report the sensed parameter value over the communication infrastructure at MAP 108. Sensed parameters may include, hut are not to be limited to, for example, temperature-related parameters e.g., temperature), power-related parameters power consumption), etc.

Management blocks 106, or a subset thereof, may be dynamically reconfigurable to perform a function of one or more other management blocks 106, As an example, MGB 106-1 may be dynamically re-configurable to access and/or determine the status of IC block 102-2, and to report the status over the communication infrastructure at MAP 108-1, when MGB 106-2 fails to report the status of IC block 102-2. MGB 106-1 may be dynamically reconfigurable to perform additional functions of MGB 106-2 if the status of IC block 102-2 indicates that task block 104-2 is substantially operational and MGB 106-2 is faulty, such as to permit task block 104-2 to remain operational. As another example, MGB 106-1 may be dynamically re-configurable to access a sensed parameter value within IC block 102-2 when MGB 106-2 fails to do so. As a further example, MGB 106-1 may be dynamically reconfigurable to access sensed parameter values within other IC blocks, for example other IC blocks that neighbor IC block 102-2, and use those accessed parameter values to estimate a parameter value of IC block 102-2, when a sensed parameter value from IC block 102-2 is not accessible or available.

Management blocks 106, or a subset thereof, may be dynamically reconfigurable as a baseboard management controller (BMC) 101 to perform management functions such as, without limitation, monitoring processing of other ones of IC blocks 102, coordinating arbitration and allocation of shared resources amongst IC blocks 102, logging system errors, coordinating fault resilient booting ("FRB") of IC blocks 102, load balancing amongst IC blocks 102, controlling access to various components within the communication infrastructure, fan control, power supply monitoring and regulation, and temperature monitoring. A management block 106 may be designated as a BMC based on, for example, having the lowest or highest identification number, being the first management block to check in, etc.

IC blocks 102, or a subset thereof, may be dynamically reconfigurable to perform one or more assigned tasks of one or more other ones of IC blocks 102. As an example, IC block 102-1 may be dynamically reconfigurable to reduce a temperature of one or more other IC blocks 102. IC block 102-1 may be dynamically reconfigurable to perform one or more assigned tasks of one or more other ones of IC blocks 102 if, for example, the one or more other IC blocks are unable to perform one or more assigned tasks, or to reduce a task load of the one or more other IC blocks, or when the one or more other IC blocks are placed in a reduced power consumption state, etc. Other scenarios in which an IC block 102 may perform one or more assigned tasks of one or more other IC blocks 102 may be contemplated.

Each IC block 102, or a subset thereof, may be configured as described below with reference to FIG. 2. IC blocks 102 are not, however, limited to the example of FIG. 2.

System 100 may include a communication infrastructure to communicate amongst IC blocks 102. The communication infrastructure may be configured to provide all-to-all connectivity amongst the MAPs, System 100 may represent an IC package and each IC block 102 may represent a corresponding SoC of the IC package, such as described below with reference to FIG. 3, which also shows a communication infrastructure 303 with all-to-all connectivity, according to an embodiment. System 100 is not, however, limited to the example of FIG. 3.

System 100 may represent a server system and each IC block 102 may represent a corresponding blade of the server system, such as described below with reference to FIG. 4. System 100 is not, however, limited to the example of FIG. 4.

Figure 2:
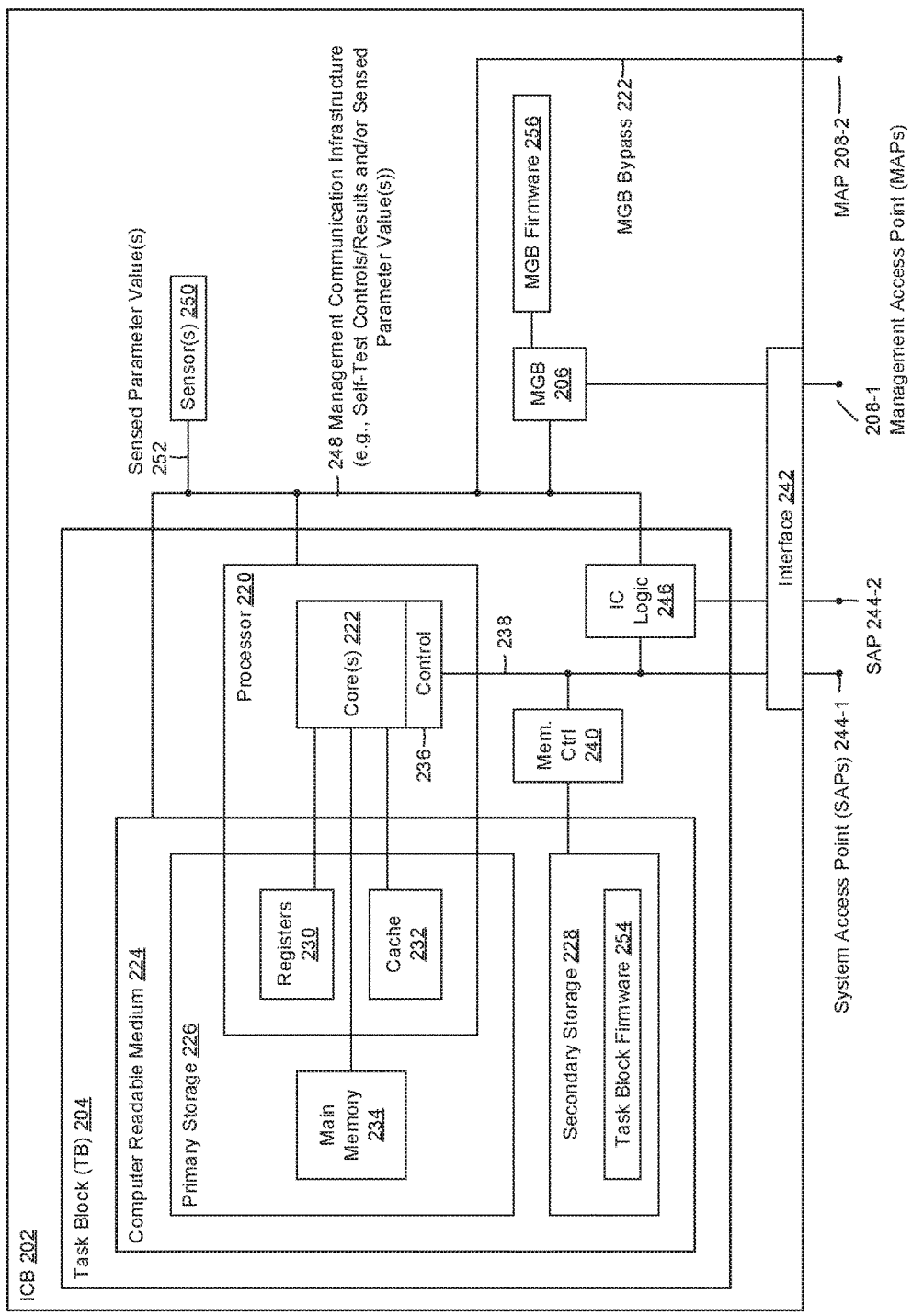
FIG. 2 is a block diagram of an integrated circuit (IC) block described herein, according to an embodiment.

FIG. 2 is a block diagram of an IC block 202 that may include a task block 204 and a management block 206. Task block 204 may include one or more processors 220, each of which may include one or more processor cores 222 to execute computer program instructions. Processor 220 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Task block 204 may further include a computer-readable medium 224 to store computer program instructions and data to be used and/or generated by processor 220 when executing the computer program instructions. Medium 224 may include a transitory and/or non-transitory medium. In the example of FIG. 2, medium 224 may include primary storage 226 and secondary storage 228.

Primary storage 226 may include registers 230, processor cache 232, and main memory or system memory 234. Registers 230 and cache 232 may be directly accessible to core(s) 222. Main memory 234 may be accessible to processor 220 and/or core(s) 222 directly and/or indirectly through a memory link or bus. Primary storage 226 may include volatile and non-volatile memory such as random-access memory (RAM) and variations thereof including, without limitation, static RAM (SRAM), dynamic RAM (DRAM), synchronous DRAM, (SDRAM), and/or double data rate SDRAM (DDR SDRAM).

Secondary storage 228 may be indirectly accessible to processor 220 and/or core(s) 222 over communication infrastructure 238, and may include non-volatile memory such as read-only memory (ROM) and variations thereof including, without limitation, programmable ROM (PROM), erasable PROM (EPROM), and electrically erasable PROM (EEPROM). Non-volatile memory may also include non-volatile RAM (NVRAM) such as flash memory.

Processor 220 may further include a control unit 236 to interface between core(s) 222 and internal communication infrastructure 238.

Task block 204 may further include a memory controller 240 to interface between processor 220 and internal communication infrastructure 238.

IC block 202 may further include an interface 242 to interface between processor 220 and external communication infrastructure at a system access point (SAP) 244-1.

Task block 204 may include IC logic 246 to perform one or more pre-configured and/or configurable functions. Processor 220 may be configured to interface with IC logic 246 over communication infrastructure 238. Interface 242 may be configured to interface between IC logic 246 and external communication infrastructure at a SAP 244-2.

In FIG. 2, IC block 202 may further include one or more sensors 250, which may include one or more environmental sensors, such as a temperature sensor, fan speed sensor, voltage sensor, and/or power consumption sensor. Sensor(s) 250 are not, however, limited to these examples.

IC block 202 may further include task block firmware 254 and/or MGB firmware 256. Task block firmware 254 and MGB firmware 256 may each include a computer program product including at least one computer-readable medium having computer program logic, such as computer-executable instructions, stored therein to cause IC block 202 to perform one or more features and/or combinations of features disclosed herein.

IC block 202 may further include management communication infrastructure 248 to permit management block 206 to access task block 224 and sensed parameter value(s) 252. IC block 202 may further include a MGB bypass 222 to permit another IC block to access management communication infrastructure 248, such as to allow another IC block to manage the functions of IC block 202, for example, when management block 206 cannot.

Figure 3:
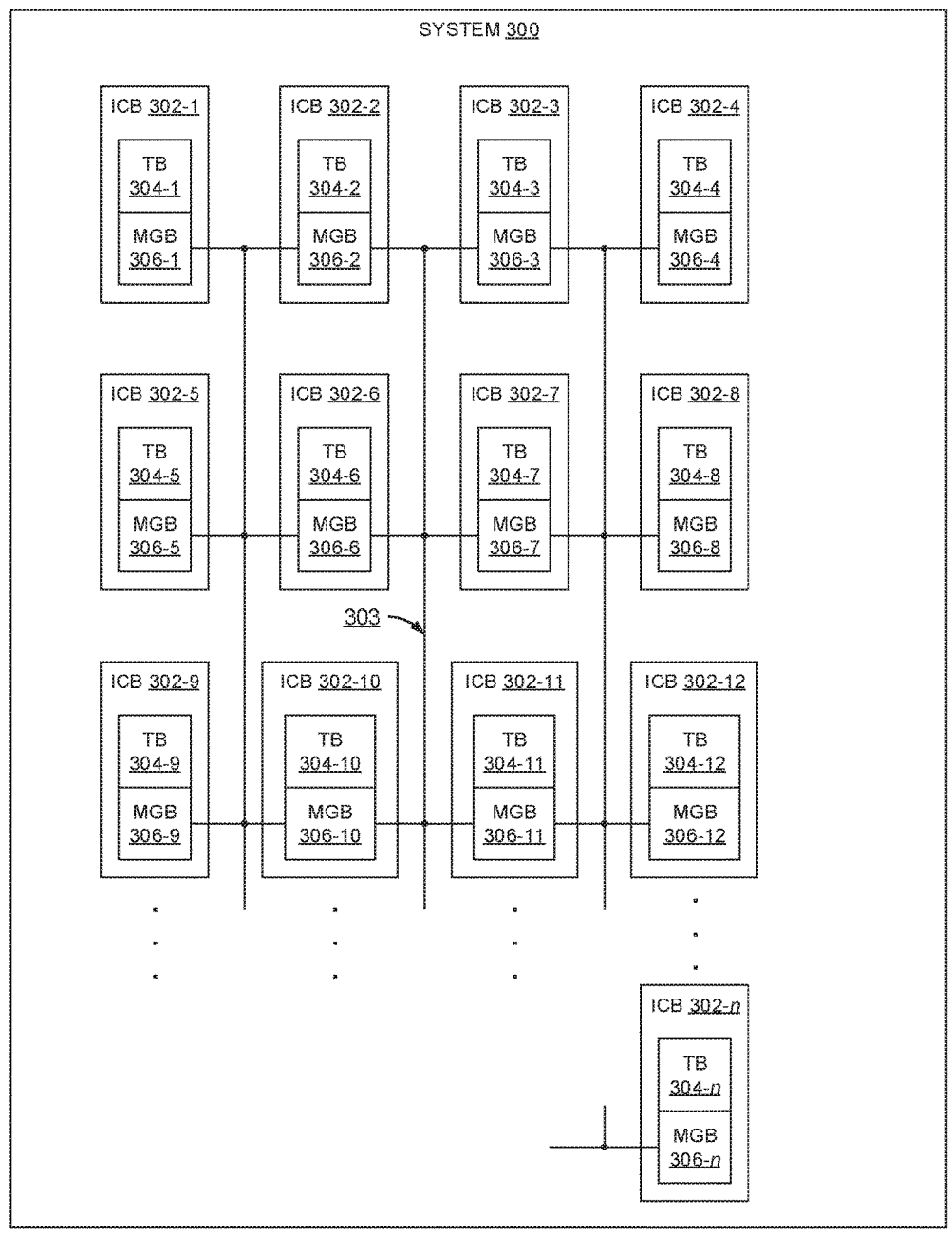
FIG. 3 is a block diagram of an IC package, according to an embodiment.

FIG. 3 is a block diagram of an IC package 300 that includes multiple IC blocks 302. In IC package 300, each IC block 302 may represent a corresponding SoC of the IC package. IC package 300 may include a communication infrastructure 303. Communication infrastructure 303 may be configured to provide all-to-all connectivity amongst the MAPs of IC blocks 302. Communication infrastructure 303 may be, for example, a fabric to fabric interface. Communication infrastructure 303 may include one or more common crossbars. Communication infrastructure 303 may provide a communication path from each management block 306 to each of the other management blocks 306. With this infrastructure, one or more management blocks 306 may be dynamically configurable to bridge multiple communication paths. As an example, management blocks 306-6 and 306-7 may be configured to bridge communication paths between management block 306-5 and 306-8.

Currently, a layout of a SoC-based micro server FRU includes multiple SoCs, with each SoC on a given card, and a routing signal between the various SoCs is used for manageability and boot capabilities of each SoC node. If part of an SoC fails, the entire FRU may need to be replaced. This type of FRU may also benefit from an all-to-all communication infrastructure similar to that described above. An example of this is shown in FIG. 4.

Figure 4:
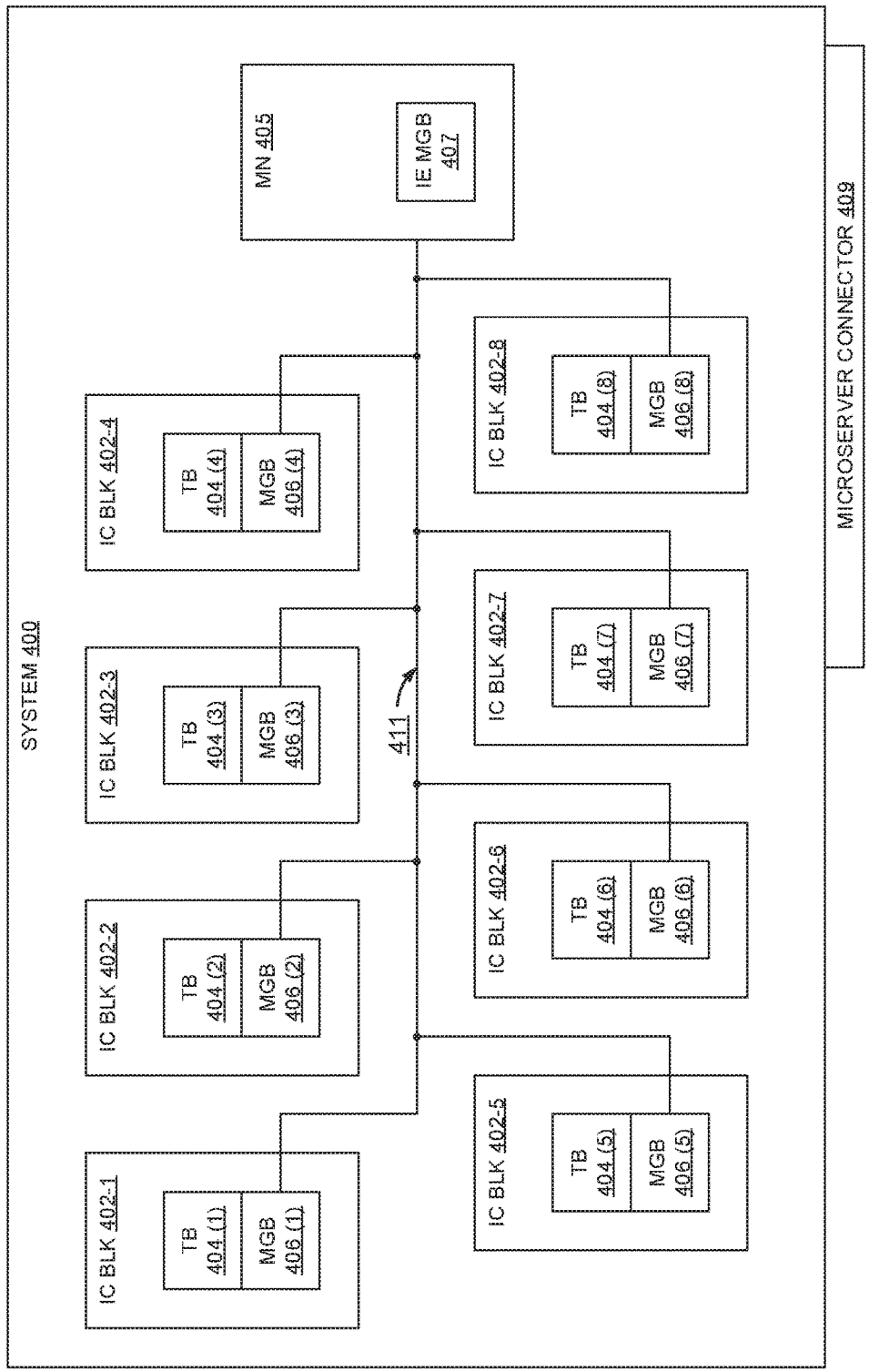
FIG. 4 is a block diagram of a server system, according to an embodiment.

FIG. 4 is a block diagram of a server system 400 that includes multiple IC blocks 402, each configured as a corresponding blade of server system 400. IC blocks 402 may include task blocks 404 and management blocks 406, where management blocks 406 may all be linked via a common cross-bar-type communication infrastructure 411 for all-to-all connectivity. System 400 may further include a multi-node component 405 that may include a management block 407 that is connected to the management blocks 406 through the communication infrastructure 411. A multi-node system may include having more than one system in a given silicon package (e.g., two laptops contained within a single laptop). Server system 400 may also include a connector 409 that connects the server system 400 to system access points. Connector 409 may be, but is not to be limited to, for example, a system management bus (SMBus), an Ethernet connector, a PCI Express (PCIe) interconnect, an I/O sideband fabric (e.g., IOSF), etc.

Figure 5:
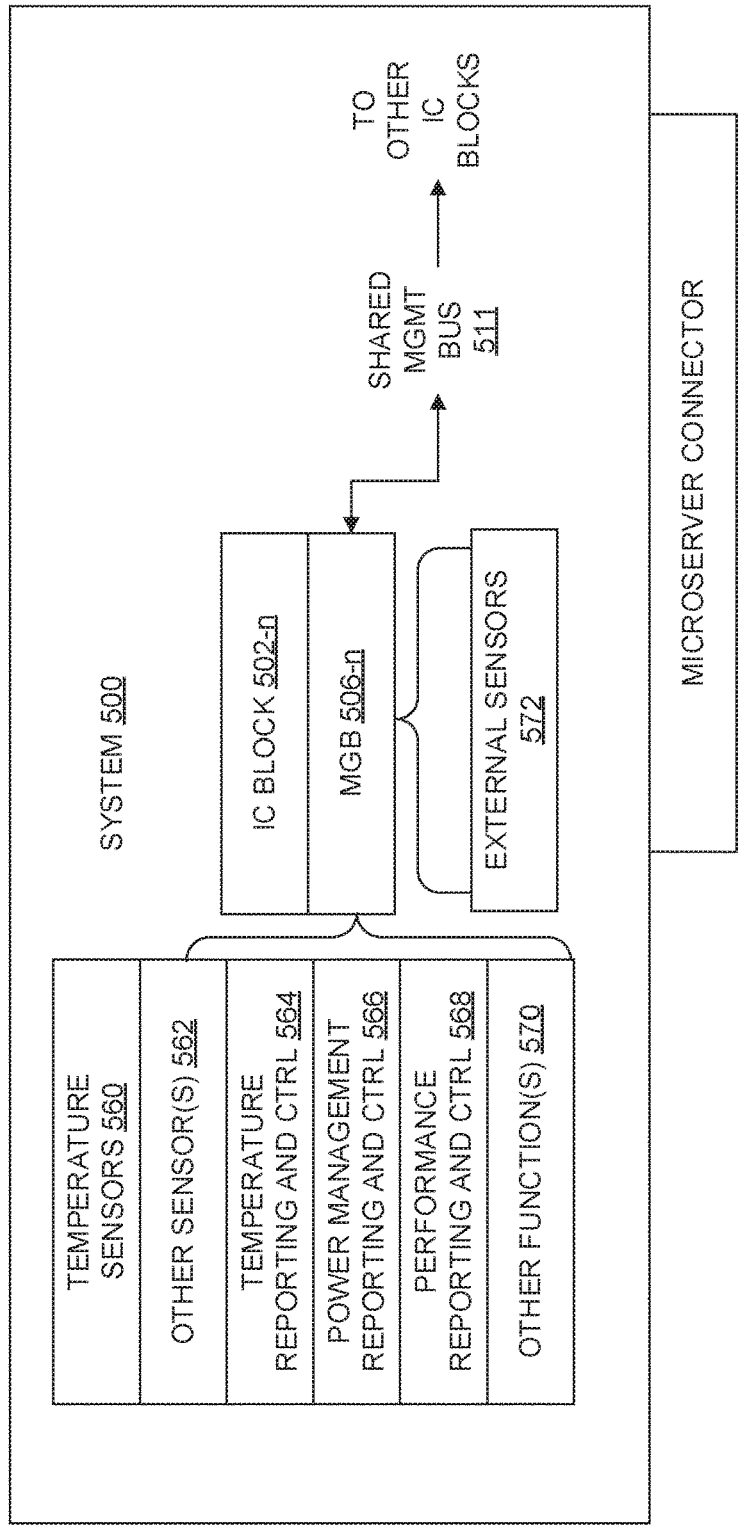
FIG. 5 is a block diagram illustrating reporting and control capabilities of an IC block of a server system, according to an embodiment.

FIG. 5 is a block diagram illustrating reporting and control capabilities of an IC block 502-n of a server system 500, according to an embodiment. IC block 502-n may include management block 506-n. Management block 506-n may manage and/or access data from temperature sensors 560 and/or one or more other sensor(s) 562. The one or more other sensor(s) 562 may include, for example, fan speed sensor(s), voltage sensor(s), and/or power consumption sensor(s). Other sensor(s) 562 are not, however, limited to these examples. Management block 506-n may also manage various IC functions, including, but not to be limited to, temperature management reporting and control 564, power management reporting and control 566, performance reporting and control 568, and other IC functions 570 of IC block 502-n or other IC blocks in communication with IC block 502-n. Management block 506-n may also manage and/or access data from external sensors 572, such as sensors located at other IC blocks or other sensors in communication with management block 506-n. Management 506-n may communicate with other IC blocks via a shared management link or bus 511.

As an example, if an on-die temperature sensor of an IC block of server system 400 of FIG. 4 fails, other IC blocks (e.g., neighboring IC blocks) may provide temperature estimation based upon their functional temperature sensor parameter values and their distances from the failed IC block. This may allow the server system 400 to continue operation without fault. As another example, if a management block of an IC block fails, other IC blocks (e.g., neighboring IC blocks) may take over communication to the failed IC block via communication infrastructure 411. To accomplish this, wire forwarding and/or a common Power Control Unit (P-Unit/PCU) address may be used. For example, a common wire may include slave addresses for each socket's relative P-Unit/PCU. A P-Unit/PCU may control power and other tasks inside the silicon using pCode, which runs on the hardware of the P-Unit/PCU. Wire forwarding may be broadcast with locality timeouts. For example, if a targeted IC block does not respond in a given time (which may optionally be included with the broadcast message), a neighbor IC block may claim the transaction, determine the problem, resolve the problem, etc. For the IC package example of FIG. 3, the communication infrastructure 303 similarly allows other (e.g., neighboring) IC blocks to mitigate failures of faulty IC blocks. To accomplish this, a broadcast Configuration Space Register (CSR) may be used and may be accessed via the P-unit/PCU via a Platform Environment Control Interface (PECI) interface. A PECI interface is a bus or communication pathway for external components to communicate with a P-Unit/PCU.

Figure 6:
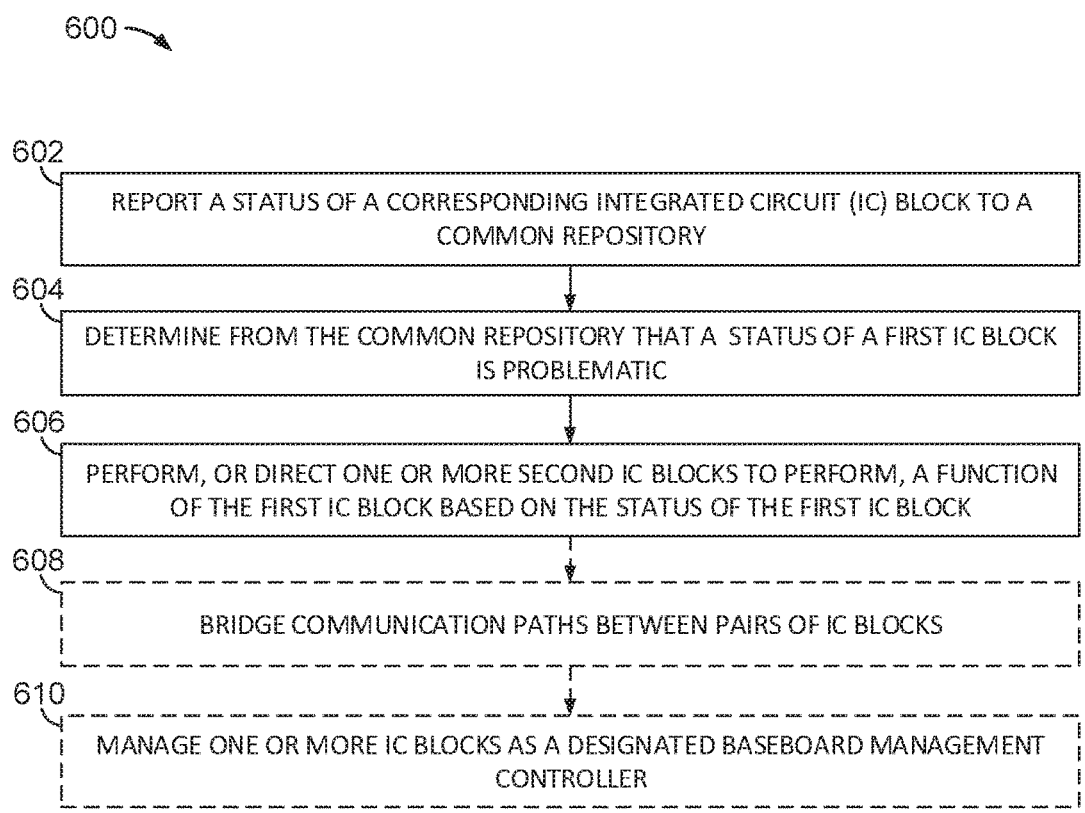
FIG. 6 is a flow chart of a method that may be carried out by a system described herein, according to an embodiment.

FIG. 6 is a flow chart of a method 600 that may be carried out by a system described herein, according to an embodiment. At 602, a management block may report a status of its corresponding IC block to, for example, a common register or other accessible data repository. The data repository may be located at a centralized location accessible to the IC blocks of a SoC-based system, or may be duplicated at each IC block (e.g., within storage 226 as shown in FIG. 2). At 604, the management block may determine from the data repository that a status of a first IC block is problematic (e.g., its status was not reported, data to be reported from that IC block was not accessible, a parameter to be reported by that IC block was not sensed, etc.). In an embodiment, subtractive decoding may be used to determine what IC block may have a failure and what needs to be done to remedy it. At 606, the management block may perform a function, or direct one or more second IC blocks to perform a function, of the first IC block based on the first IC block status. For example, if status was not reported by the first IC block, the management block may access the unreported status and report it for the first IC block, or direct another IC block to do so. As another example, if the first IC block has a temperature that is above a given threshold but cannot perform the function of reducing the temperature, the management block may reduce the temperature of the first IC block, or direct another IC block to do so. Many other scenarios may be contemplated. The method is not to be limited by these examples.

Optionally, at 608, the management block may bridge communication paths between pairs of IC blocks. For example the management block may be located between two IC blocks within the communication infrastructure and may pass along communications from a first IC block to a second IC block, as was described above with reference to FIG. 3.

Optionally, at 610, the management block may manage one or more IC blocks as a designated baseboard management controller. As a baseboard management controller, the management block may perform management functions such as, without limitation, monitoring processing of other IC blocks, coordinating arbitration and allocation of shared resources amongst IC blocks, logging system errors, coordinating fault resilient booting ("FRB") of IC blocks, load balancing amongst IC blocks, controlling access to various components within the communication infrastructure, fan control, power supply monitoring and regulation, and temperature monitoring.

As a management controller, a management block may be configurable to dynamically re-assign a function from an other IC block to one or more other IC blocks. The management controller may be configurable to re-assign the function within a subset of IC blocks, or to reassign the function between a pair of IC blocks, for example. The re-assigned function may be a management function or a task function. As an example of re-assigning a management function, a management controller may re-assign a management function from an other IC block if status is not received from the other IC block. As another example, a management controller may re-assign a management function from an other IC block if status from the other IC block indicates a fault in the management block of the other IC block. As an example of re-assigning a task function, a management controller may re-assign a task function from an other IC block if status from the other IC block indicates a fault in the task block of the other IC block. The management controller may re-assign a task function of an other IC block based on a sensed temperature reported by a management block of the other IC block or one or more other management blocks of other IC blocks. As a further example, the management controller may re-assign a task function from an other IC block to balance power consumption among multiple IC blocks. As yet another example, the management controller may re-assign a task function of an other IC block to balance processing load among multiple IC blocks. The management controller may divide a task function among multiple IC blocks. For example, a management controller may re-assign a task function from a first set of multiple IC blocks to a second set of one or more IC blocks, and place the first set of IC blocks in a reduced power consumption state, for example. In an embodiment, each task function may include, for example, a function for which data and/or control is received from another device and processed with an assigned task block, and/or a function for which data and/or a control is provided to another device for further processing.

Figure 7:
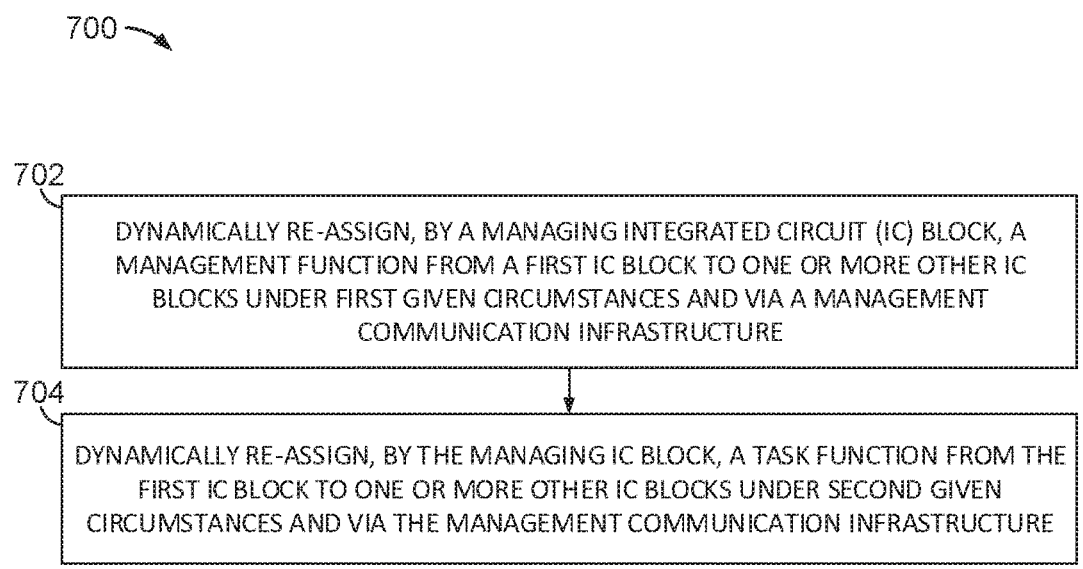
FIG. 7 is a flow chart of a method that may be carried out by a system described herein, according to an embodiment.

FIG. 7 is a flow chart of a method 700 that may be carried out by a system described herein, according to an embodiment. At 702, a managing integrated circuit (IC) block may dynamically re-assign a management function from a first IC block to one or more other IC blocks under first given circumstances and via a management communication infrastructure, as described elsewhere herein. At 704, the managing IC block may dynamically re-assign a task function from the first IC block to one or more other IC blocks under second given circumstances and via the management communication infrastructure, as also described elsewhere herein.

Figure 8:
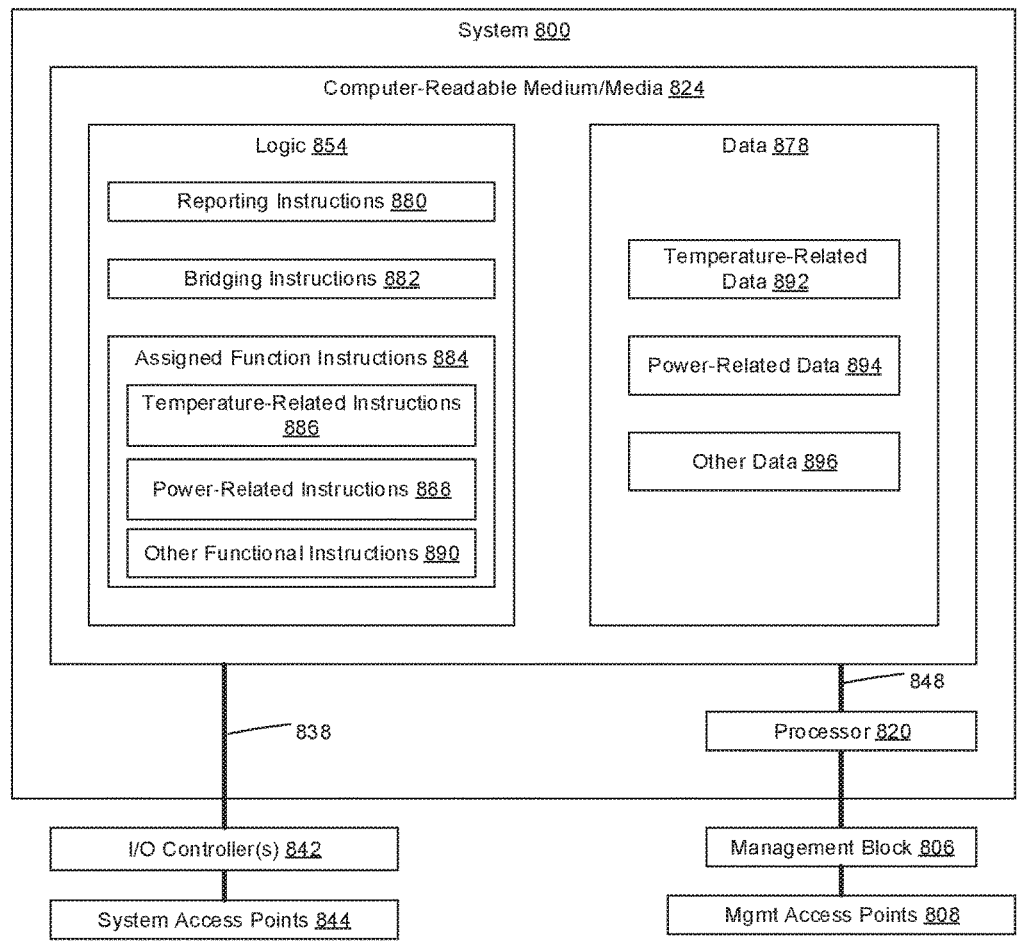
FIG. 8 is a block diagram of a computing system, according to an embodiment.

FIG. 8 is a block diagram of a computing system 800, according to an embodiment. Computing system 800 may represent a task block, such as task block 204 described above with reference to FIG. 2, or any other task block described herein. Computing system 800 may include one or more processors, illustrated here as a processor 820. Computing system 800 may further include a computer-readable medium or media 824, which may include a computer program or logic 854 encoded therein, including instructions to be executed by processor 820. Computer-readable medium 824 may further include data 878, which may be used by processor 820 during execution of computer program 854, and/or generated by processor 820 during execution of computer program 854.

Processor 820 may include one or more instruction processors and/or processor cores, and a control unit to interface between the instruction processor(s)/core(s) and medium 824. Processor 820 may include, without limitation, one or more of a microprocessor, a graphics processor, a physics processor, a digital signal processor, a network processor, a front-end communications processor, a co-processor, a management engine (ME), a controller or microcontroller, a central processing unit (CPU), a general purpose instruction processor, or an application-specific processor.

Medium 824 may include a transitory or non-transitory computer-readable medium, and may include one or more types of media disclosed below with reference to FIG. 9. Computer-readable medium 824 is not, however, limited to the examples of FIG. 9.

Figure 9:
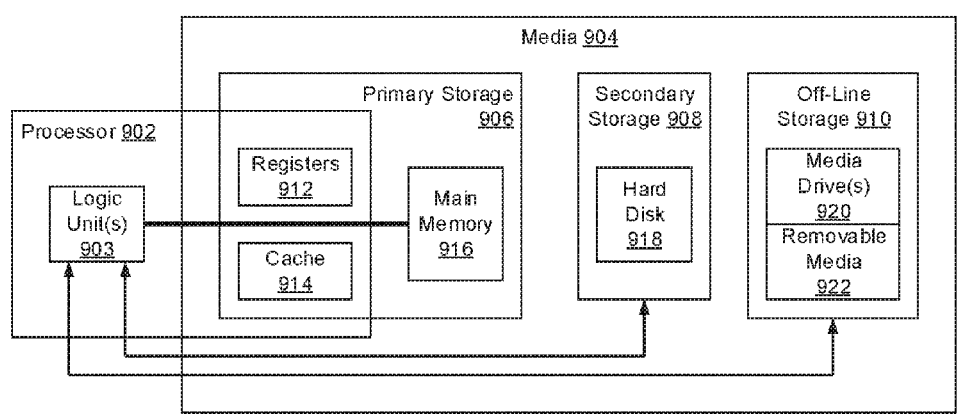
FIG. 9 is a block diagram of a processor and computer-readable media, according to an embodiment.

FIG. 9 is a block diagram of a processor 902 and computer-readable media 904. In FIG. 9, media 904 may include primary storage 906, secondary storage 908, and off-line storage 910. Primary storage 906 may include registers 912, processor cache 914, and main memory or system memory 916. Registers 912 and cache 914 may be directly accessible by processor 902. Main memory 916 may be accessible to processor 902 directly and/or indirectly through a memory link or bus. Primary storage 906 may include volatile memory such as random-access memory (RAM) and variations thereof including, without limitation, static RAM (SRAM) and/or dynamic RAM (DRAM).

Secondary storage 908 may be indirectly accessible to processor 902 through an input/output (I/O) channel, and may include non-volatile memory such as read-only memory (ROM) and variations thereof including, without limitation, programmable ROM (PROM), erasable PROM (EPROM), and electrically erasable PROM (EEPROM). Non-volatile memory may also include non-volatile RAM (NVRAM) such as flash memory. Secondary storage 908 may be configured as a mass storage device, such as a hard disk or hard drive, a flash memory drive, stick, or key, a floppy disk, and/or a zip drive. Off-line storage 910 may include a physical device driver and an associated removable storage medium, such as an optical disc.

Referring back to FIG. 8, computer program or logic 854 may include various types of instructions to cause processor 820 to execute various functions described herein. Processor 820 may execute the various functions under the direction of a management block 806 for a corresponding IC block, for example. Computer program or logic 854 may include, for example, reporting instructions 880, bridging instructions 882, assigned function instructions 884, and/or other instructions, etc such as described in one or more examples above. Assigned function instructions 884 may include, for example, temperature-related instructions 886, power-related instructions 888, and/or other functional instructions 890, such as described in one or more examples above. The instructions of computer program or logic 854 may access, use, change, and/or generate data such as temperature-related data 892, power-related data 894, and/or other data 896 as needed to carry out the various functions.

Computing system 800 may include a communications infrastructure 848 to communicate amongst devices and/or resources of computing system 800. Communication infrastructure 848 may be used to communicate with management block 806 or one or more other management blocks through one or more management access points 808, such as described in one or more examples above. Computing system 800 may also include one or more input/output (I/O) devices and/or controllers 842 to interface with one or more other systems via one or more system access points 844.

Technologies disclosed herein may be implemented with respect to one or more of a variety of systems, such as described below with reference to FIG. 10. Technologies disclosed herein are not, however, limited to the examples of FIG. 10.

Figure 10:
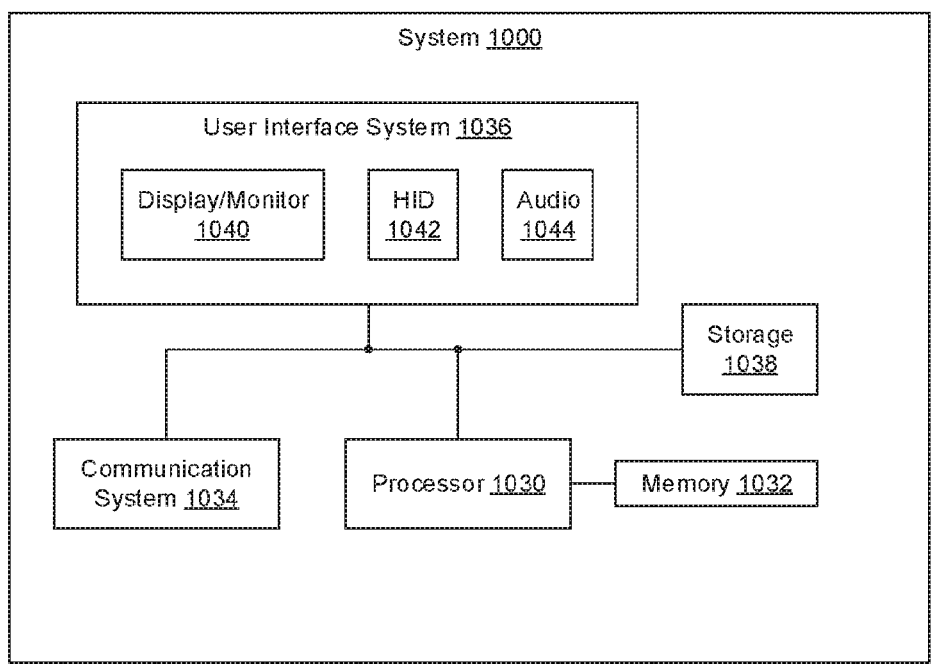
FIG. 10 is a block diagram of a computing system, according to an embodiment.

FIG. 10 is a block diagram of a system 1000, including a processor 1030 and associated memory, cache, and/or other computer-readable medium, illustrated here as memory 1032. System 1000 further includes a communication system 1034 and a user interface system 1036. System 1000 may further include an electronic or computer-readable storage medium (storage) 1038, which may be accessible to processor 1030, communication system 1034, and/or user interface system 1036. System 1000 may be a system, or may be a part of a system, that includes an IC package and/or server system as described herein.

Communication system 1034 may include a wired and/or wireless communication system, and may be configured to communicate with an external communication network on behalf of processor 1030 and user interface system 1036. The external network may include a voice network (e.g., a wireless telephone network), and/or a data or packet-based network (e.g., a proprietary network and/or the Internet).

User interface system 1036 may include a monitor or display 1040 and/or a human interface device (HID) 1042, HID 1042 may include, without limitation, a key board, a cursor device, a touch-sensitive device, a motion and/or image sensor, a physical device and/or a virtual device, such as a monitor-displayed virtual keyboard. User interface system 1036 may include an audio system 1044, which may include a microphone and/or a speaker.

System 1000 may be configured as a mobile device or a non-mobile device. For example, system 1000 may be configured as a stationary or portable/hand-held system, and may be configured as, for example, a mobile telephone, a set-top box, a gaming device, and/or a rack-mountable, desk-top, lap-top, notebook, net-book, note-pad, or tablet system, and/or other conventional and/or future-developed system(s). System 1000 is not, however, limited to these examples.

Technologies are disclosed herein with the aid of functional building blocks illustrating functions, features, and relationships thereof. At least some of the boundaries of these functional building blocks have been arbitrarily defined herein for the convenience of the description. Alternate boundaries may be defined no long as the specified functions and relationships thereof are appropriately performed. While various embodiments are disclosed herein, it should be understood that they are presented as examples. The scope of the claims should not be limited by any of the example embodiments disclosed herein.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (NSW), a system-on-a-chip (SOC), and combinations thereof.

As discussed above, one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer-readable medium having computer program logic, such as computer-executable instructions, stored therein to cause a computer system to perform one or more features and/or combinations of features disclosed herein. The computer-readable medium may be transitory or non-transitory. An example of a transitory computer-readable medium may be a digital signal transmitted over a radio frequency or over an electrical conductor, through a local or wide area network, or through a network such as the Internet. An example of a non-transitory computer-readable medium may be a compact disk, a flash memory, or other data storage devices, such as SRAM, DRAM, hard drives, solid state drives, etc.

Technologies for providing manageability redundancy for micro server and clustered SoC deployments are described herein. The technologies described herein may allow a SoC to step in to manage and/or execute the reporting and/or functions of a failing SoC via a common crossbar. However, the particular examples and scenarios used in this document are for ease of understanding and are not to be limiting. The technologies described herein may be used for other contemplated purposes.

An advantage of using the technologies described herein is that SoC-based systems may still continue to run despite sub-component failures, resulting in yield improvement and an increase in reliability, availability, and serviceability (RAS). A further advantage is an availability of a system manageability mechanism for such SoC-based systems at a low cost. Many other advantages may also be contemplated.

As used in this application and in the claims, a list of items joined by the term "one or more of" can mean any combination of the listed terms. For example, the phrases "one or more of A. 13 or C" and "one or more of A, B, and C" can mean A; B; C; A and B; A and C; B and C; or A, B and C.

The following examples pertain to further embodiments.

Example 1 may include a configurable multi-processor apparatus, comprising multiple integrated circuit (IC) blocks, where each IC block includes a task block to perform one or more assignable task functions and a management block to perform management functions with respect to the corresponding IC block; each task block and each management block includes one or more instruction processors and corresponding memory; and each IC block is controllable to perform a function of one or more other IC blocks.

Example 2 may include the subject matter of Example 1, wherein each management block is controllable to perform a management function of one or more other management blocks.

Example 3 may include the subject matter of Example 1 or Example 2, wherein each task block is controllable to perform a task function of one or more other task blocks.

Example 4 may include the subject matter of any of Examples 1-3, wherein each management block is configured to report a status of the corresponding IC block over a management communication infrastructure, and each management block is controllable to access another IC block and report status of the accessed IC block over the management infrastructure.

Example 5 may include the subject matter of any of Examples 1-4, wherein each management block is configurable to report a parameter value, and each management block is controllable to access another IC block and report the parameter value of the accessed IC block.

Example 6 may include the subject matter of any of Examples 1-5, wherein each management block is configurable to report a parameter value, and each management block is controllable to estimate and report the parameter value on behalf of another management block.

Example 7 may include the subject matter of Example 5 or Example 6, wherein the parameter includes a sensed parameter.

Example 8 may include the subject matter of any of Examples 5-7, wherein the parameter includes a temperature.

Example 9 may include the subject matter of any of Examples 5-8, wherein the parameter includes a power consumption parameter.

Example 10 may include the subject matter of any of Examples 1-9, wherein one or more of the IC blocks are configurable as a management controller to manage other ones of the IC blocks, including to dynamically re-assign a function from a first IC block to one or more other IC blocks.

Example 11 may include the subject matter of Example 10, wherein the management controller is configured to dynamically re-assign the function within a subset of IC blocks.

Example 12 may include the subject matter of Example 11, wherein the management controller is configured to dynamically re-assign the function between a pair of IC blocks.

Example 13 may include the subject matter of any of Examples 10-12, wherein the management controller is configured to dynamically re-assign a management function from the first IC block.

Example 14 may include the subject matter of Example 13, wherein the management controller is configured to dynamically re-assign the management function from the first IC block if status is not received from the first IC block.

Example 15 may include the subject matter of Example 13 or Example 14, wherein the management controller is configured to dynamically re-assign the management function from the IC block if status from the first IC block indicates a fault in the corresponding management block.

Example 16 may include the subject matter of any of Examples 13-15, wherein the management controller is configured to dynamically re-assign a task function from the first IC block.

Example 17 may include the subject matter of Example 16, wherein the management controller is configured to dynamically re-assign the task function from the first IC block if status from the first IC block indicates a fault in the corresponding task block.

Example 18 may include the subject matter of Example 16 or Example 17, wherein the management controller is configured to dynamically re-assign the task function from the first IC block based on a sensed temperature reported by one or more of the management blocks.

Example 19 may include the subject matter of any of Examples 16-18, wherein the management controller is configured to dynamically re-assign the task function from the first IC block to balance power consumption amongst multiple IC blocks.

Example 20 may include the subject matter of any of Examples 16-19, wherein the management controller is configured to dynamically re-assign the task function to balance processing load amongst multiple IC blocks.

Example 21 may include the subject matter of any of Examples 10-20, wherein the management controller is configured to dynamically divide a task function amongst multiple IC blocks.

Example 22 may include the subject matter of any of Examples 10-21, wherein the management controller is configured to dynamically re-assign a task function from a first set of multiple IC blocks to a second set of one or more IC blocks, and place the first set of IC blocks in a reduced power consumption state.

Example 23 may include the subject matter of any of Examples 1-22, wherein each task function includes one or more of a function for which data and/or a control is received from another device and processed within an assigned task block; and a function for which data and/or a control is provided to another device for further processing.

Example 24 may include the subject matter of any of Examples 1-23, wherein the management communication infrastructure includes a communication path from each of the management blocks to each of the other management blocks.

Example 25 may include the subject matter of any of Examples 1-24, wherein the management communication infrastructure includes a communication path between pairs of management blocks, and wherein the management blocks are controllable and dynamically configurable to bridge multiple communication paths.

Example 26 may include the subject matter of any of Examples 1-25, wherein the multiple IC blocks are on a same IC device.

Example 27 may include the subject matter of any of Examples 1-26, wherein each of the IC blocks is on a corresponding IC device of a blade of a server system:

Example 28 may include a multi-processor system having a dynamically re-configurable multi-processor support system, comprising: a first set of one or more instruction processors and corresponding memory; a user interface to interface between the first set of one or more instruction processors and one or more human interface devices; and a set of multiple integrated circuit (IC) blocks to perform task functions in support of the first set of one or more instruction processors; wherein each IC block includes a task block to perform one or more assignable task functions, and a management block to perform management functions with respect to the corresponding IC block; wherein each task block and each management block includes one or more instruction processors and corresponding memory, and wherein each IC block is controllable to perform a function of one or more other IC blocks.

Example 29 may include the subject matter of Example 28, wherein each management block is controllable to perform a management function of one or more other management blocks.

Example 30 may include the subject matter of Example 28 or Example 29, wherein each task block is controllable to perform a task function of one or more other task blocks.

Example 31 may include the subject matter of any of Examples 28-30, wherein one or more of the IC blocks is configurable as a management controller to manage other ones of the IC blocks, including to dynamically re-assign a function from a first IC block to one or more other IC blocks.

Example 32 may include the subject matter of Example 31, wherein the management controller is configured to dynamically re-assign a management function from the first IC block.

Example 33 may include the subject matter of Example 32, wherein the management controller is configured to dynamically re-assign the management function from the first IC block if status is not received from the first IC block.

Example 34 may include the subject matter of Example 32 or Example 33, wherein the management controller is configured to dynamically re-assign the management function from the IC block if status from the first IC block indicates a fault in the corresponding management block.

Example 35 may include the subject matter of any of Examples 32-34, wherein the management controller is configured to dynamically re-assign a task function from the first IC block.

Example 36 may include the subject matter of Example 35, wherein the management controller is configured to dynamically re-assign the task function from the first IC block if status from the first IC block indicates a fault in the corresponding task block.

Example 37 may include the subject matter of Example 35 or Example 36, wherein the management controller is configured to dynamically re-assign the task function from the first IC block based on a sensed temperature reported by the first IC block.

Example 38 may include the subject matter of any of Examples 35-37, wherein the management controller is configured to dynamically re-assign the task function from the first IC block based on sensed temperatures reported by multiple IC blocks.

Example 39 may include the subject matter of any of Examples 35-38, wherein the management controller is configured to dynamically re-assign the task function from the first IC block to balance power consumption amongst multiple IC blocks.

Example 40 may include the subject matter of any of Examples 35-39, wherein the management controller is configured to dynamically re-assign the task function to balance processing load amongst multiple IC blocks.

Example 41 may include the subject matter of any of Examples 31-40, wherein the management controller is further configured to dynamically divide a task function amongst multiple IC blocks.

Example 42 may include the subject matter of any of Examples 31-41, wherein the management controller is configured to dynamically re-assign a task functions from a first set of one or more IC blocks to a second set of one or more IC blocks to place the first set of IC blocks in a reduced power consumption state.

Example 43 may include a system comprising means for performing features of the apparatus of any one of Examples 1-42.

Example 44 may include a computer-readable medium encoded with a computer program, including instructions to cause a processor to perform functions of a management controller as recited in of any one of Examples 10-22.

Example 45 may include a method of performing in accordance with of any one of Examples 1-42.

Example 46 may include at least one computer-readable medium comprising a plurality of instructions that in response to being executed on a computing device, cause the computing device to carry out a method according to Example 45.

Example 47 may include a communications device arranged to perform the method of Example 45.

Example 48 may include a method of managing integrated circuit (IC) blocks, comprising: dynamically re-assigning, by a managing IC block of the IC blocks, a management function from a first IC block of the IC blocks to one or more other IC blocks under first given circumstances and via a management communication infrastructure; and dynamically re-assigning, by the managing IC block, a task function from the first IC block to one or more other IC blocks under second given circumstances and via the management communication infrastructure; wherein each IC block includes a task block to perform one or more assignable task functions and a management block to perform management functions with respect to the corresponding IC block; and wherein the IC blocks are in communication with each other via the management communication infrastructure.

Example 49 may include the subject matter of Example 48, wherein the dynamically re-assigning the management function comprises dynamically re-assigning the management function within a subset of IC blocks.

Example 50 may include the subject matter of Example 48, wherein the dynamically re-assigning the management function comprises dynamically re-assigning the management function between a pair of IC blocks.

Example 51 may include the subject, matter of Example 48, wherein the dynamically re-assigning the management function comprises dynamically re-assigning the management function from the first IC block if status is not received from the first IC block.

Example 52 may include the subject matter of Example 48, wherein the dynamically re-assigning the management function comprises dynamically re-assigning the management function from the first IC block if status from the first. IC block indicates a fault in the corresponding management block.

Example 53 may include the subject matter of Example 48, wherein the dynamically re-assigning the task function comprises dynamically re-assigning the task function if status from the first IC block indicates a fault in the corresponding task block.

Example 54 may include the subject matter of Example 48, wherein the dynamically re-assigning the task function comprises dynamically re-assigning the task function from the first IC block based on a sensed temperature reported by one or more of the management blocks.

Example 55 may include the subject matter of Example 48, wherein the dynamically re-assigning the task function comprises dynamically re-assigning the task function from the first IC block to balance power consumption amongst multiple IC blocks.

Example 56 may include the subject matter of Example 48, wherein the dynamically re-assigning the task function comprises dynamically re-assigning the task function to balance processing load amongst multiple IC blocks.

Example 57 may include the subject matter of Example 48, wherein the dynamically re-assigning the task function comprises dynamically dividing the task function amongst multiple IC blocks.

Example 58 may include the subject matter of Example 48, wherein the dynamically re-assigning the task function comprises dynamically re-assigning the task function from a first set of multiple IC blocks to a second set of one or more IC blocks, and placing the first set of IC blocks in a reduced power consumption state.

Example 59 may include a system comprising means for performing the method of any one of Examples 48-58.

Example 60 may induce a computer-readable medium encoded with a computer program, including instructions to cause a processor to perform the method of any one of Examples 48-58.

Example 61 may include at least one computer-readable medium comprising a plurality of instructions that, in response to being executed on a computing device, cause the computing device to carry out a method according to any one of Examples 48-58.

Example 62 may include a communications device arranged to perform the method of any one of Examples 48-58.

Example 63 may include a method comprising: reporting a status of a corresponding integrated circuit (IC) block to a common repository over a management communication infrastructure, the IC block being one of multiple IC blocks that each include a task block to perform one or more assignable functions and a management block to perform management functions; determining from the common repository that a status of a first IC block of the multiple IC blocks is problematic; and performing, or directing one or more second IC blocks of the multiple blocks to perform, a function of the first IC block based on the status of the first IC block.

Example 64 may include the subject matter of Example 63, wherein the performing or directing includes performing or directing the determination and reporting of the status of the first IC block if the status of the first IC block is unreported.

Example 65 may include the subject matter of Example 63, wherein the performing or directing includes performing or directing estimation and reporting of a parameter value at a location of the first IC block if the parameter value could not be sensed at the first IC block.

Example 66 may include the subject matter of Example 63, wherein the performing or directing includes performing or directing accessing and reporting a parameter value sensed by the first IC block when the first IC block fails to report the sensed parameter value.

Example 67 may include the subject matter of Example 66, wherein the accessing and reporting the parameter value sensed by the first IC block includes accessing and reporting a temperature sensed by the first IC block.

Example 68 may include the subject matter of Example 66, wherein the accessing and reporting the parameter value sensed by the first IC block includes accessing and reporting a power consumption parameter value sensed by the first IC block.

Example 69 may include the subject matter of Example 63, wherein the performing or directing includes performing or directing the performing of an assigned function of the first IC block.

Example 70 may include the subject matter of Example 69, wherein the performing or directing the performing of the assigned function includes performing or directing reducing a temperature of the first IC block.

Example 71 may include the subject matter of Example 69, wherein the performing or directing the performing of the assigned function includes performing or directing of the assigned function of the first IC block if the first IC block is unable to perform the assigned function.

Example 72 may include the subject matter of Example 69, wherein the performing or directing the performing of the assigned function includes performing or directing reducing a task load of the first IC block.

Example 73 may include the subject matter of Example 69, wherein the performing or directing the performing of the assigned function includes performing or directing of the assigned function of the first IC block when the first IC block is placed in a reduced power consumption state.

Example 74 may include the subject matter of Example 69, wherein the performing of directing the performing of the assigned function includes performing or directing the performing of assigned functions of the first IC block and one or more additional other IC blocks when the first IC block and the one or more additional other IC blocks are placed in a reduced power consumption state.

In Example 75, the subject matter of Example 63 may optionally include performing, or directing the performing of assigned functions of the first IC block and one or more other IC blocks when the first IC block and the one or more other IC blocks are placed in a reduced power consumption state.

In Example 76, the subject matte f Example 63 may optionally include managing one or more of the multiple IC blocks as a designated baseboard management controller.

Example 77 may include the subject matter of Example 63, wherein the management communication infrastructure includes a communication path from each of the management blocks to each of the other management blocks.

Example 78 may include the subject matter of Example 63, wherein the management communication infrastructure includes a communication path between each of multiple pairs of management blocks, and wherein the method further includes bridging multiple ones of the communication paths.

Example 79 may include at least one computer-readable medium comprising a plurality of instructions that in response to being executed on a computing device, cause the computing device to carry out a method according to any one of Examples 63-78.

Example 80 may include a device arranged to perform the method of any one of Examples 63-78.

Example 81 may include an apparatus configured to perform the method of any one of the Examples 63-78.

Example 82 may include a computer system to perform the method of any of Examples 63-78.

Example 83 may include a machine to perform the method of any of Examples 63-78.

Example 84 may include an apparatus comprising: means for performing the method of any one of Examples 63-78.

What is claimed is:

1. A multi-processor system having a dynamically re-configurable multi-processor support system, comprising:
a set of multiple integrated circuit (IC) blocks, wherein each IC block includes a task block to perform one or more assignable task functions, and a management block to perform management functions with respect to the corresponding IC block and each task block and each management block includes a processor, and
wherein a management block in the set is to detect the presence of a circumstance associated with a first IC block in the set and reassign, in response to a detection of the circumstance, a function of the first IC block in the set to a second IC block in the set; and
the second IC block is to perform, in response to the reassignment of the function, the function of the first IC block.

2. The system of claim 1, wherein to detect the presence of a circumstance comprises to determine that the first IC block has not reported a status within a predefined period of time.

3. The system of claim 1, wherein the management block is further to determine a temperature of the first IC block as a function of reported temperatures of other IC blocks in the set.

4. The system of claim 3, wherein the management block is further to determine the temperature of the first IC block as a function of a distance of each other IC block associated with a reported temperature in the set.

5. The system of claim 1, wherein the management block is to communicate with the other IC blocks in the set through a crossbar to which the other IC blocks are connected.

6. The system of claim 1, wherein the management block is to establish a communication bridge between two other IC blocks in the set.

7. The system of claim 1, wherein to reassign a function of the first IC block to the second IC block in the set comprises to assign a function to control a temperature of the first IC block.

8. The system of claim 1, wherein the management block is further to control the first IC block to operate in a low power consumption state after the function has been reassigned to the second IC block.

9. The system of claim 1, wherein the management block is to communicate with each IC block using a power control unit (PCU) address.

10. The system of claim 1, wherein to reassign a function from the first IC block to the second IC block comprises to reassign a management function from the first IC block to the second IC block.

11. A method comprising:
detecting, with a management block in a set of multiple integrated circuit (IC) blocks, in which each IC block includes a task block to perform one or more assignable task functions and a management block to perform management functions with respect to the corresponding IC block, the presence of a circumstance associated with a first IC block in the set;

reassigning, with the management block and in response to a detection of the circumstance, a function of the first IC block in the set to a second IC block in the set; and performing, with the second IC block and in response to the reassignment of the function, the function of the first IC block.

12. The method of claim 11, wherein detecting the presence of a circumstance comprises determining that the first IC block has not reported a status within a predefined period of time.

13. The method of claim 11, further comprising determining, with the management block, a temperature of the first IC block as a function of reported temperatures of other IC blocks in the set.

14. The method of claim 13, to determine the temperature of the first IC block comprises to determine the temperature further as a function of a distance of each other IC block associated with a reported temperature in the set.

15. The method of claim 11, further comprising communicating, by the management block, with the other IC blocks in the set through a crossbar to which the IC blocks in the set are connected.

16. The method of claim 11, further comprising establishing, by the management block, a communication bridge between two other IC blocks in the set.

17. The method of claim 11, wherein reassigning a function of the first IC block to the second IC block in the set comprises assigning a function to control a temperature of the first IC block.

18. The method of claim 11, further comprising controlling, with the management block, the first IC block to operate in a low power consumption state after the function has been reassigned to the second IC block.

19. The method of claim 11, further comprising communicating, by the management block, with each IC block using a power control unit (PCU) address.

20. A non-transitory computer-readable medium comprising a plurality of instructions that, in response to being executed on a computing device to:

detect, with a management block in a set of multiple integrated circuit (IC) blocks, in which each IC block includes a task block to perform one or more assignable task functions and a management block to perform management functions with respect to the corresponding IC block, the presence of a circumstance associated with a first IC block in the set;

reassign, with the management block and in response to a detection of the circumstance, a function of the first IC block in the set to a second IC block in the set; and perform, with the second IC block and in response to the reassignment of the function, the function of the first IC block.

* * * * *